United States Patent
Lin et al.

(10) Patent No.: US 7,053,939 B2
(45) Date of Patent: May 30, 2006

(54) AUTOMATIC DOCUMENT DETECTION METHOD AND SYSTEM

(75) Inventors: Qian Lin, Santa Clara, CA (US);
Daniel Tretter, San Jose, CA (US);
Jian Fan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 910 days.

(21) Appl. No.: 09/982,620

(22) Filed: Oct. 17, 2001

(65) Prior Publication Data

US 2003/0072568 A1    Apr. 17, 2003

(51) Int. Cl.
*H04N 5/262* (2006.01)

(52) U.S. Cl. .................................... 348/239

(58) Field of Classification Search ............... 382/228, 382/200; 358/471; 348/229.1, 230.1, 239
See application file for complete search history.

(56) References Cited

U.S. PATENT DOCUMENTS

| | | | |
|---|---|---|---|
| 5,534,916 A * | 7/1996 | Sakaguchi | 348/229.1 |
| 5,596,655 A | 1/1997 | Lopez | |
| 5,604,536 A | 2/1997 | Takaiwa et al. | |
| 5,787,195 A * | 7/1998 | Tsujimoto et al. | 382/176 |
| 5,808,756 A * | 9/1998 | Matsuda | 358/474 |
| 5,887,086 A * | 3/1999 | Tokano | 382/312 |
| 5,940,544 A * | 8/1999 | Nako | 382/293 |
| 5,999,646 A * | 12/1999 | Tamagaki | 382/283 |
| 6,144,403 A * | 11/2000 | Otani | 348/208.12 |
| 6,163,342 A * | 12/2000 | Suzuki | 348/229.1 |
| 6,222,640 B1 * | 4/2001 | Peulen et al. | 358/1.9 |
| 6,289,122 B1 * | 9/2001 | Karidi | 382/228 |
| 6,366,699 B1 * | 4/2002 | Kuwano et al. | 382/200 |
| 6,473,523 B1 * | 10/2002 | Newman et al. | 348/333.12 |
| 6,540,415 B1 * | 4/2003 | Slatter et al. | 348/373 |
| 6,563,948 B1 * | 5/2003 | Tan et al. | 382/187 |
| 6,567,559 B1 * | 5/2003 | Easwar | 382/228 |
| 6,628,833 B1 * | 9/2003 | Horie | 382/272 |
| 6,771,838 B1 * | 8/2004 | Fan | 382/274 |
| 6,856,356 B1 * | 2/2005 | Kahn | 348/371 |
| 6,903,767 B1 * | 6/2005 | Robins et al. | 348/239 |
| 6,937,272 B1 * | 8/2005 | Dance | 348/208.2 |
| 6,975,352 B1 * | 12/2005 | Seeger et al. | 348/218.1 |
| 2001/0020977 A1 | 9/2001 | Watanabe | |
| 2002/0097439 A1 * | 7/2002 | Braica | 382/266 |
| 2004/0201720 A1 * | 10/2004 | Robins et al. | 348/222.1 |

FOREIGN PATENT DOCUMENTS

| EP | 0974811 | 11/2000 |
|---|---|---|
| JP | 102620173 | 9/1998 |

\* cited by examiner

*Primary Examiner*—David Ometz
*Assistant Examiner*—Jason Whipkey

(57) ABSTRACT

A method and system for capturing images. First, a preview image of a scene is captured. Next, an automatic determination is made whether the scene is a document. When it is determined that the scene is a document, at least one camera control is set to a value that is tailored for document capture. The scene is then captured using the set camera controls. Image processing that is tailored for documents is then performed on the captured scene.

21 Claims, 6 Drawing Sheets

AUTOMATIC DOCUMENT DETECTION METHOD AND SYSTEM

FIELD OF THE INVENTION

The present invention relates generally to digital cameras, and more particularly, to a method and system for automatically determining that a scene is a document and tailoring the image capture and image processing accordingly.

BACKGROUND OF THE INVENTION

Most digital cameras have a single mode of operation, and as such, do not provide any special processing for documents. As can be appreciated, since the same image processing techniques and image capture parameters are uniformly applied to the capture image without regard to the content of the image, documents captured by these digital cameras are of very poor quality and are often not readable.

There are some cameras, such as the RDC-i700 digital camera available from Ricoh Inc. of West Caldwell, N.J., that have a document mode. With these cameras, a user can manually select a document mode. Once in document mode, the camera attempts to use camera settings that are more suitable for documents versus a natural scene.

Unfortunately, the user has to switch the digital camera into document mode. While a user is very good at determining whether a scene is a document, the user may forget to switch to normal mode when taking the next picture. As can be appreciated, this requirement for the user to remember to switch between normal mode and document mode can lead to poor image quality for those natural scenes, where the setting is document mode. Consequently, it would be desirable for there to be a mechanism that would automatically detect whether a scene is a natural scene or a document and automatically switch to an appropriate mode with user intervention.

Furthermore, those cameras with a document mode offer only tolerable and primitive image processing that leads to very noisy images. For example, the documents often appear very dark, and the text often appears blurry. Consequently, it is desirable for there to be a digital camera that has improved image processing capabilities so that appearance of captured documents can be more clear.

Based on the foregoing, there remains a need for a method and system for a mechanism to automatically determining that a scene is a document and tailoring the image capture and image processing accordingly and that overcomes the disadvantages set forth previously.

SUMMARY OF THE INVENTION

According to one embodiment of the present invention, an automatic document detection method is described. First, a preview image of a scene is captured. Next, an automatic determination is made whether the scene is a document. When it is determined that the scene is a document, at least one camera control is programmed with a value that is tailored for document capture. The scene is then captured using the programmed camera controls. Image processing that is tailored for documents is then performed on the captured scene. When it is determined that the scene is not a document, standard camera settings are used for image capture, and standard image processing is performed on the captured image.

BRIEF DESCRIPTION OF THE DRAWINGS

The present invention is illustrated by way of example, and not by way of limitation, in the figures of the accompanying drawings and in which like reference numerals refer to similar elements.

FIG. 8 and FIG. 9 illustrate vertical differences and horizontal differences, respectively, that may be utilized in step 410 of FIG. 4.

DETAILED DESCRIPTION

A method and system for automatically determining that a scene is a document and tailoring the image capture and image processing for documents are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Taking a picture involves letting light fall on film or an image sensor under controlled conditions. This process is often referred to as an exposure. When a photographer presses the shutter button, blades (known as a diaphragm) inside the lens shift to form an opening that is referred to as the aperture. As can be appreciated, the amount of light that exposes a frame depends on the shutter speed and the size of the aperture.

As described previously, the lens has diaphragm blades that open and close to form certain-sized holes (i.e., apertures) that control the amount of light allowed to expose the film or image sensor. The aperture scale, which is found on the lens' aperture ring, is referred to as f-number or f/stops.

In addition to controlling the quantity of light entering the camera, the aperture affects the depth of field, which in turn affects the way that a picture looks. When a subject is in focus, there is a certain area in front of the subject and behind the subject that is also in focus. This range of sharpness is called depth of field.

One or more of these different parameters may be controlled by a document mode camera control mechanism 134 of the present invention as described in greater detail hereinafter with reference to FIG. 7.

Digital Image Capture Device 100

Figure 1:
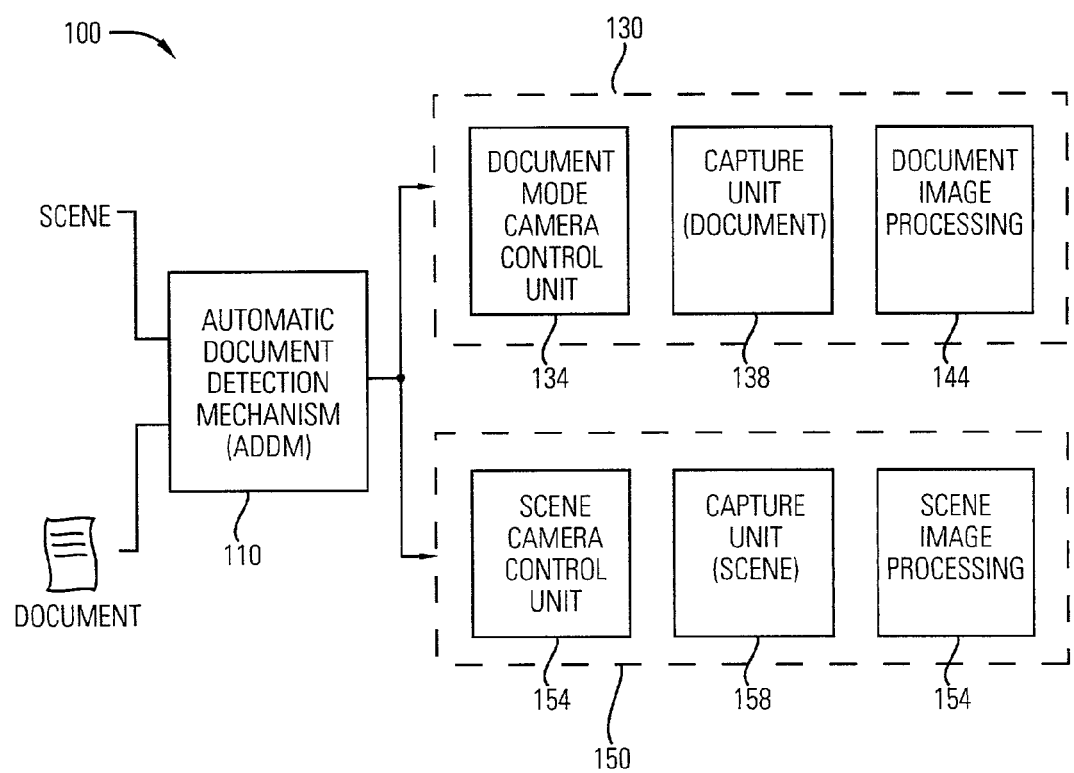
FIG. 1 illustrates a digital image capture device in which the automatic document detection mechanism and document image processing mechanism according to one embodiment of the present invention can be utilized.

FIG. 1 illustrates a digital image capture device 100 in which the automatic document detection mechanism (ADDM) 110 and document image processing mechanism 120 according to one embodiment of the present invention can be utilized. As used herein, the term "document" can be, but is not limited to, a magazine page, a page in a book, a computer printout, information written on a whiteboard, a slide projected from a projector (e.g., a LCD projector), a presentation displayed by a projector (e.g., an overhead projector). A document can include a mixture of text, graphics, and images.

The digital image capture device 100 includes an automatic document detection mechanism (ADDM) 110 for automatically evaluating whether a scene is a document or a natural scene (i.e., a non-document image). The automatic document detection mechanism 110 is described in greater detail hereinafter with reference to FIGS. 2, 4, and 5.

The digital image capture device 100 includes a document processing block 130 for processing scenes that are determined to be a document by the automatic document detection mechanism 110 and a natural scene processing block 150 for processing scenes that are determined not to be a document by the automatic document detection mechanism 110.

The document processing block 130 includes a document specific camera control unit 134 for providing camera settings to optimize the capture of a document. The document processing block 130 also includes a capture unit 138 for capturing the document. The document processing block 130 also includes a document image processing unit 144 for applying image processing algorithms that are tailored for enhancing document images.

The natural scene processing block 150 includes a natural scene specific camera control unit 154 for providing camera settings to optimize the capture of natural scenes (i.e., non-document images). The natural scene processing block 150 also includes a capture unit 158 for capturing the natural scene. The natural scene processing block 150 also includes a image processing unit 164 for applying image processing algorithms that are tailored for enhancing natural scenes.

It is noted that the capture unit 138 and the capture unit 158 may be implemented with a single image capture unit that has different settings as described in greater detail hereinafter with reference to FIG. 7. Similarly, the document processing block 130 and the natural scene processing block 150 may be implemented by a single image processing unit that executes different image processing programs as described in greater detail hereinafter with reference to FIG. 6. It is further noted that the document specific camera control unit 134 and the natural scene specific camera control unit 154 may be implemented as a single control unit that controls the image capture unit and the image processing unit.

Automatic Document Detection Mechanism 110

Figure 2:
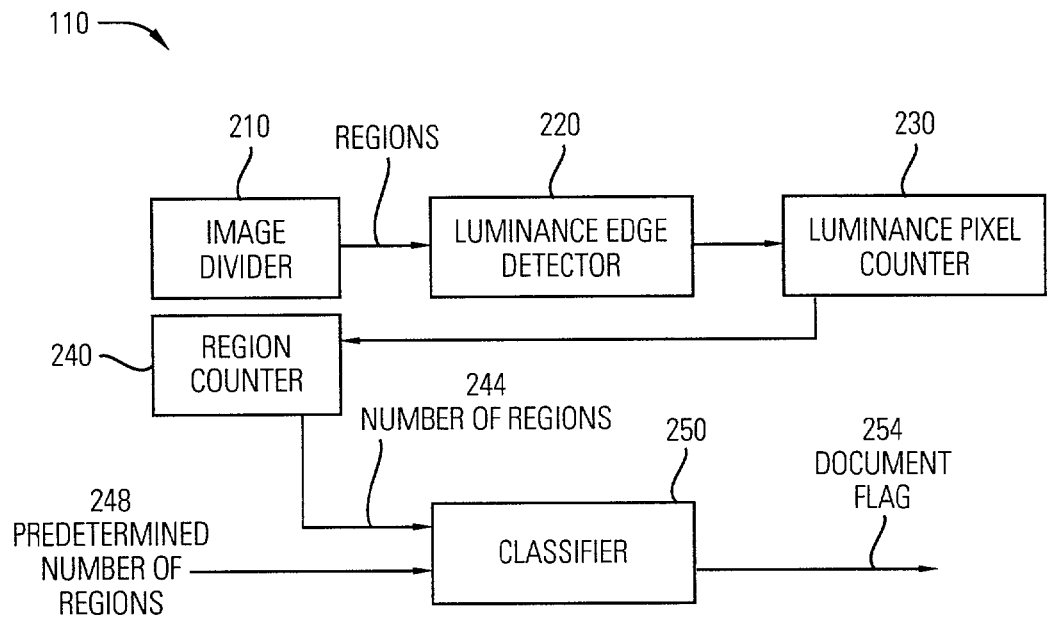
FIG. 2 is a block diagram that illustrates in greater detail the automatic document detection mechanism in accordance with a preferred embodiment of the present invention.

FIG. 2 is a block diagram that illustrates in greater detail the automatic document detection mechanism 110 in accordance with a preferred embodiment of the present invention. The automatic document detection mechanism 110 includes an image divider 210 for dividing an image (e.g., the preview image) into a plurality of regions and an edge detector 220 (e.g., a luminance edge detector) for detecting the luminance edges in each region. An edge pixel counter 230 is provided for counting the number of luminance edges in each region.

A region determination unit 240 (also referred to herein as a region counter) determines the number of regions in which the number luminance edges is greater than a predetermined number of edges. When the number of regions exceeds a predetermined number of regions, the classifier 250 classifies the image as a document. Otherwise, when the number 244 of regions does not exceed the predetermined number 248 of regions, the classifier 250 classifies the scene as a non-document. A Boolean variable or flag (e.g., a document flag 254) may be employed to denote whether an image is classified as a document or non-document Any document image identification algorithm that is tailored for operation on images captured by a digital camera can be utilized to detect whether the current scene is a document. A preferred document image identification algorithm is now described with reference to FIG. 4. An alternative document image identification algorithm is described with reference to FIG. 5.

Figure 4:
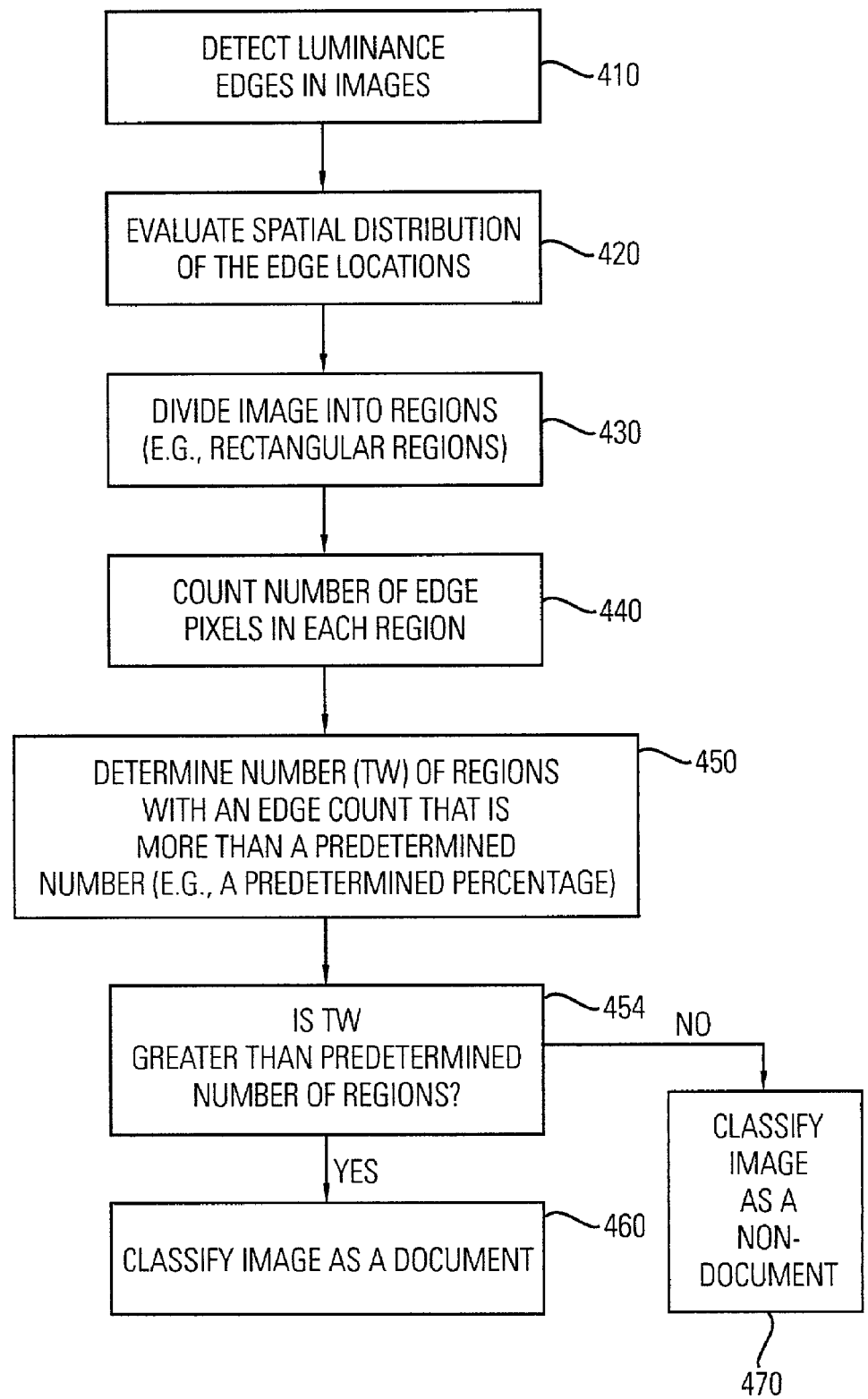
FIG. 4 is a flow chart illustrating the processing steps performed by the automatic document detection mechanism of FIG. 2 in accordance with one embodiment of the present invention.

FIG. 4 is a flow chart illustrating the processing steps performed by the automatic document detection mechanism of FIG. 2 in accordance with one embodiment of the present invention. In step 410, luminance edges within the image are detected. It is noted that edge detection algorithms that are well known by those of ordinary skill in the art can be utilized in step 410.

An exemplary edge detection scheme is now described. For each pixel location, calculate metric of adjacent differences (D1) based on image luminance Y and then compare D1 with a predetermined threshold value (Th) (e.g., 400). When the metric value (D1) is greater than the predetermined threshold (Th), the pixel is classified as an edge pixel. Otherwise, the pixel is classified as a non-edge pixel.

The metric of adjacent differences (D1) can be expressed as follows:

$$D1 = |Y_{22} - Y_{12}| + |Y_{32} - Y_{22}| + |Y_{42} - Y_{32}| + |Y_{52} - Y_{42}| +$$
$$|Y_{23} - Y_{13}| + |Y_{33} - Y_{23}| + |Y_{43} - Y_{33}| + |Y_{53} - Y_{43}| +$$
$$|Y_{24} - Y_{14}| + |Y_{34} - Y_{24}| + |Y_{44} - Y_{34}| +$$
$$|Y_{54} - Y_{44}| + |Y_{22} - Y_{21}| + |Y_{23} - Y_{22}| \ Y_{24} - Y_{23}| +$$
$$|Y_{25} - Y_{24}| + |Y_{32} - Y_{31}| \ + |Y_{33} - Y_{32}| +$$
$$|Y_{34} - Y_{33}| + |Y_{35} - Y_{34}| + |Y_{42} - Y_{41}| + |Y_{43} - Y_{42}| +$$
$$|Y_{44} - Y_{43}| + |Y_{45} - Y_{44}|$$

Figures 8, 9:
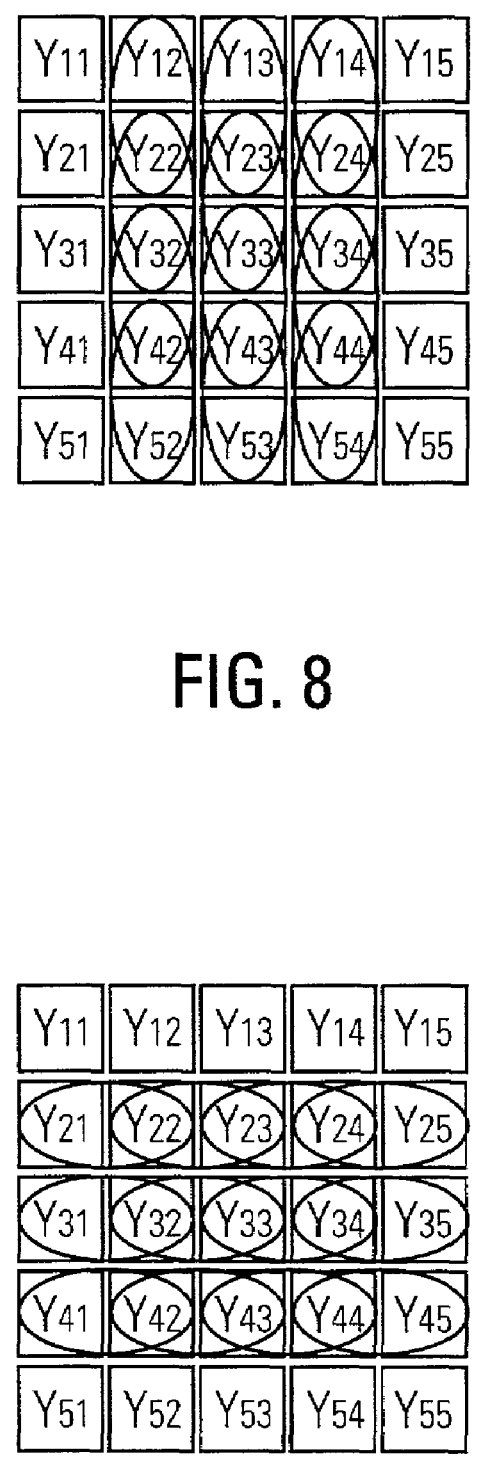

FIG. 8 illustrates vertical differences that may be utilized in step 410 of FIG. 4. FIG. 9 illustrates horizontal differences that may be utilized in step 410 of FIG. 4.

In step 420, the distribution (e.g., the spatial distribution) of the edge locations is evaluated. The evaluation step of 420 can include the following sub-steps. In step 430, the image is divided into regions (e.g., rectangular regions of equal size). In step 440, the number of edge pixels within each region is counted. In step 450, the number (Tw) of regions with edge count that is more than a predetermined edge count is determined. For example, the predetermined edge count may be expressed as a percentage (e.g., 50%) of the total region size.

In decision block 454, a determination is made whether the number of regions (Tw) is greater than a predetermined number of regions. The predetermined number of regions may be expressed as a predetermined percentage (e.g., 60%) of the total number of regions in the image. In step 460, when Tw is larger than a predetermined percentage of the total number of regions, the image is classified as a document type. Otherwise, in step 470 the image is classified as a non-document type (e.g., a natural scene).

Figure 5:
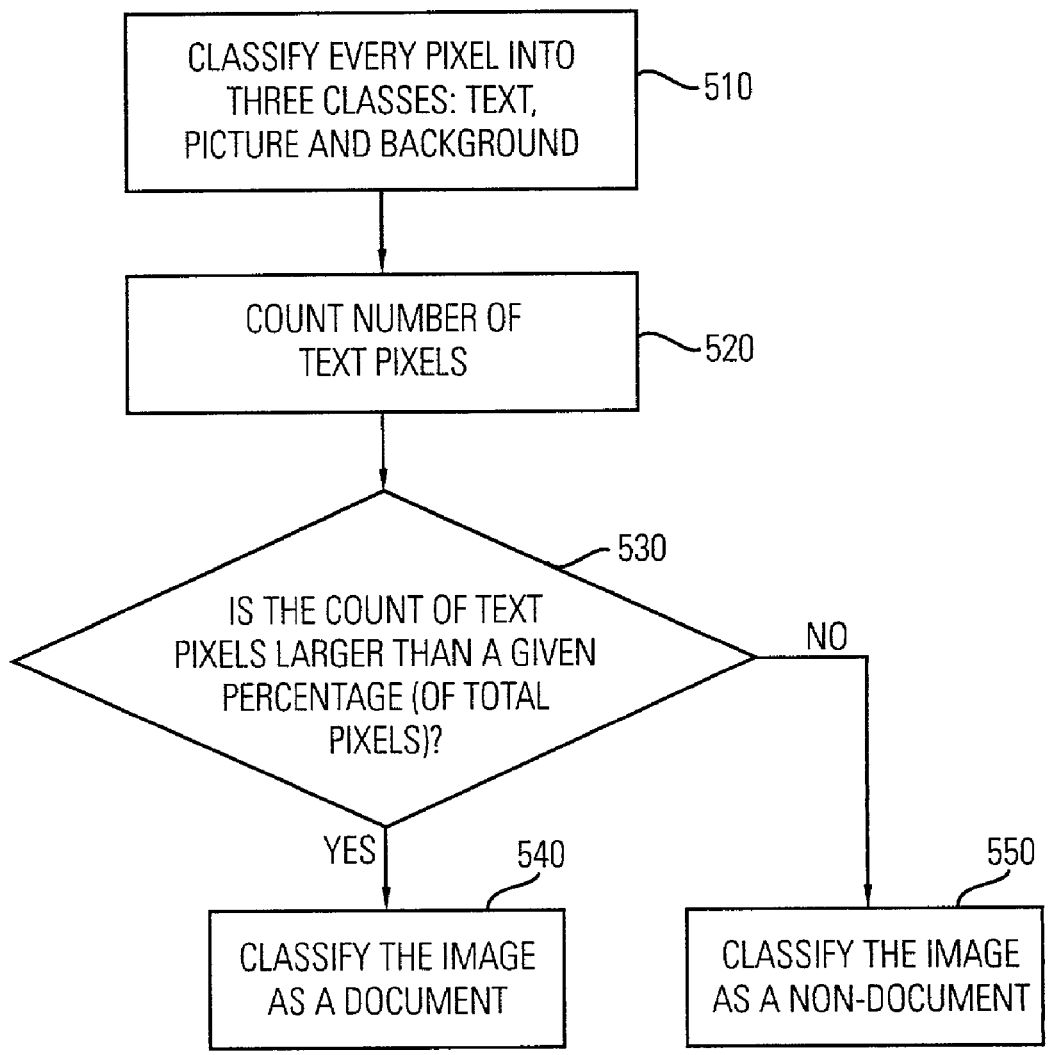
FIG. 5 is a flow chart illustrating the processing steps for automatic document detection in accordance with an alternative embodiment of the present invention.

FIG. 5 is a flow chart illustrating the processing steps for automatic document detection in accordance with an alternative embodiment of the present invention. An alternative manner in which to determine whether a scene is natural or a document is now described. In step 510, every pixel is classified into three classes of pixels, such as a text pixel class, a picture pixel class, and a background pixel class. In step 520, the number of text pixels is counted.

In decision block 530, a determination is made whether the number of text pixels is in a predetermined relationship with a predetermined percentage of the total pixels (e.g., it is determined whether the number of text pixels is larger than a predetermined percentage of the total pixels). It is noted that in step 530 the predetermined percentage can be derived by empirical tests on different types of documents.

When the number of text pixels is in a predetermined relationship with a predetermined percentage of the total pixels, in step 540, the image is classified as a document. Otherwise, when the number of text pixels is not in a predetermined relationship with a predetermined percentage of the total pixels, in step 550, the image is classified as a non-document.

Document Image Processing Mechanism 120

Figure 3:
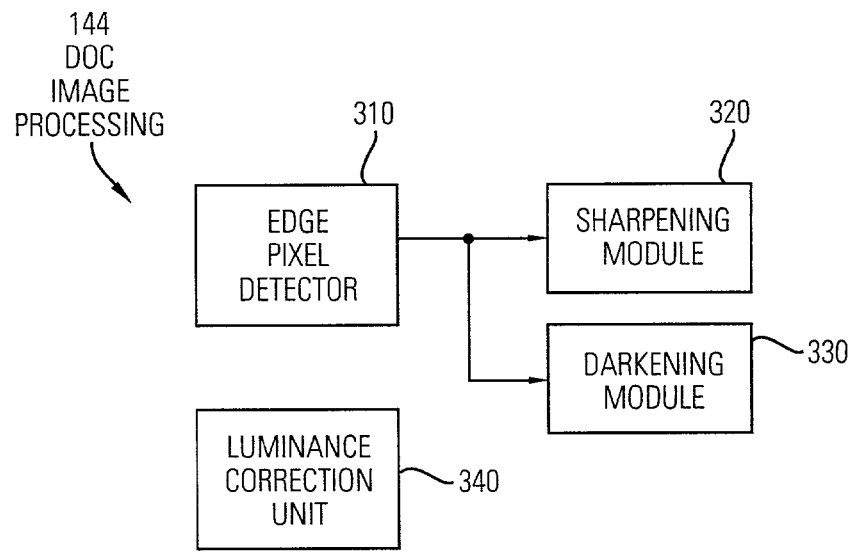
FIG. 3 is a block diagram illustrating in greater detail the document image processing mechanism in accordance with one embodiment of the present invention.

FIG. 3 is a block diagram illustrating in greater detail the document image processing mechanism 144 in accordance with one embodiment of the present invention. The document image processing mechanism 144 includes an edge pixel detector 310 for detecting edge pixels, a sharpening module 320 for sharpening the edge pixels, and a darkening module 330 for darkening the edge pixels. A luminance correction unit 340 corrects luminance of the image. For example, this may involve estimating an illumination map using the edges detected within regions and then correcting for the varying illumination across the input image.

Figure 6:
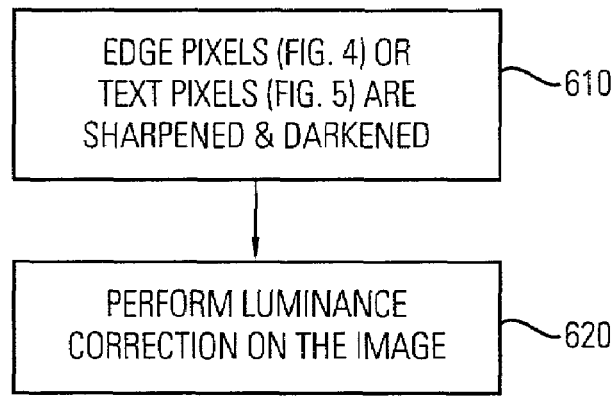
FIG. 6 is a flow chart illustrating the processing steps performed by the document image processing mechanism of FIG. 3 in accordance with one embodiment of the present invention.

FIG. 6 is a flow chart illustrating the processing steps performed by the document image processing mechanism of FIG. 3 in accordance with one embodiment of the present invention. The edge pixels of the image are first identified. For example, the edge pixels may be identified by the processing of FIG. 4 or the processing of FIG. 5. In step 610, the edge pixels determined by the processing of FIG. 4 or text pixels determined by the processing of FIG. 5 are sharpened and darkened. This image processing is tailored for documents and makes the text, graphics, and images of a document more readable by sharpening the edges of text and also by darkening the text.

In step 620, luminance correction is performed on the image. Since the lighting for the image capture may be non-uniform, the document specific image processing unit 144 corrects for non-uniformities in the background. For example, the background pixels that can represent the paper on which the text is printed may be non-white, where in fact the background of the document is supposed to be white. In this case, the document specific image processing corrects these pixels to reflect the background of the document.

Document Mode Camera Control Mechanism 140

In one embodiment, the automatic flash control unit 710 disables the flash to tailor the image capture for documents. It is noted that when a flash is utilized and directly pointed at the document, there is severe glare in the image such that a portion of the image tends to become washed out (e.g., a white area) regardless of the content of the document.

Furthermore, the shutter speed control unit 720 sets the shutter speed at a predetermined shutter speed (e.g., $\frac{1}{30}$ second or faster) in order to avoid possible motion blur caused by movement of a user's hand during image capture.

The aperture control unit 730 determines an appropriate aperture setting based on the predetermined shutter speed. For example, the aperture control unit 730 can set an aperture with a maximum opening, corresponding to a minimum f-number. When a maximum aperture is not available for the image capture device, the ISO control unit 740 accommodates the current lighting situation by modifying the ISO film speed (e.g., by increasing the ISO film speed).

Figure 7:
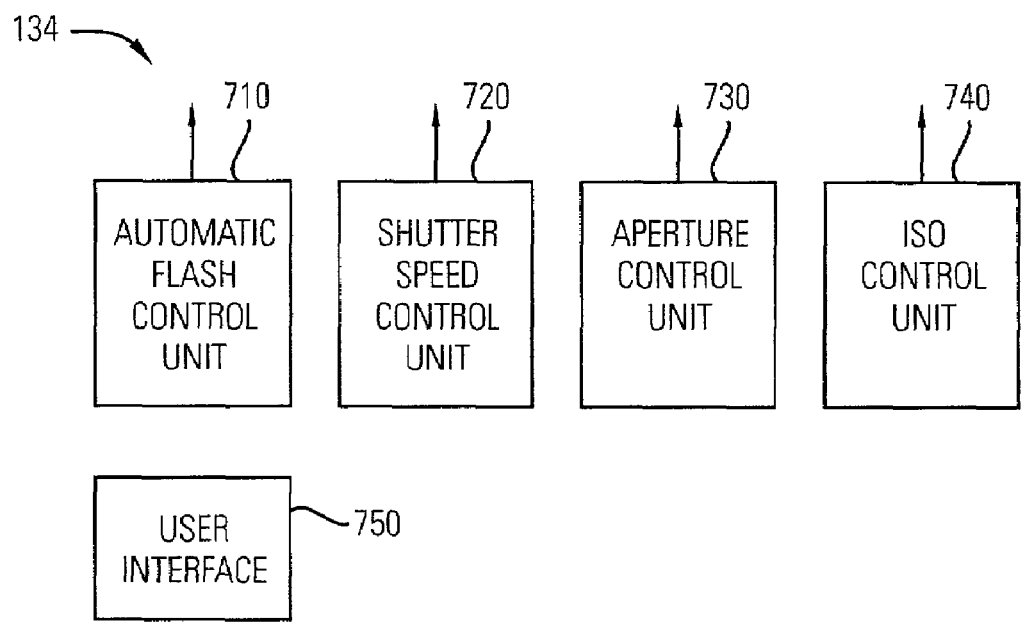
FIG. 7 is a block diagram illustrating in greater detail the document mode camera control mechanism in accordance with one embodiment of the present invention.

FIG. 7 is a block diagram illustrating in greater detail the document mode camera control mechanism in accordance with one embodiment of the present invention. The document mode camera control mechanism includes an automatic flash control unit 710, a shutter speed control unit 720, an aperture control unit 730, an ISO control unit 740, and a user interface unit 750 for generating messages and instructions for the user.

In one embodiment, the digital camera includes an automatic flash, a shutter speed control, an aperture control, and a capture plane. The document to be captured is disposed in a document plane. A first example of the type of settings programmed by the document mode camera control mechanism of FIG. 6 is now described. In this example, a user is instructed to position the digital camera in a first predetermined manner, where the capture plane is approximately parallel to the document plane. Then, the document mode camera control mechanism 134 employs the automatic flash control unit 710 to disable the automatic flash. Alternatively, the document mode camera control mechanism 134 can utilizes the user interface unit 750 for generating a message to instruct the user to manually disable the flash.

The shutter speed control unit 720 sets the shutter speed to a predetermined shutter speed (e.g., $\frac{1}{30}$ second or faster). Then, the aperture control unit 730 determines an appropriate aperture setting based on the selected shutter speed. When the required aperture is beyond the range of available aperture settings, the ISO control unit 740 can modify the ISO film speed in order to accommodate a wide variety of possible lighting situations.

In a second example, the user is instructed to position the digital camera in a second predetermined manner that reduces reflections from the document. In this example, the capture plane is at an angle with respect to the document plane, and the angle may have a value is in a predetermined range of angle values. Preferably, the predetermined range of angle values includes the range from about 22 degrees to about 45 degrees. The document mode camera control mechanism enables the automatic flash and sets a small aperture with a f-number greater than or equal to a predetermined value, for example, f/5.6, in order to secure enough depth of field to avoid out of focus blur. The document mode camera control mechanism then determines a shutter speed based on the aperture setting and sets the shutter speed accordingly.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for capturing images for use in a digital camera comprising the steps of:
   a) receiving a preview of a scene to be captured;
   b) automatically determining whether the scene to be captured is a document based on the preview by evaluating pixels of said preview of said scene to be captured to determine whether said scene to be captured is a document or whether said scene to be captured is a natural scene;
   c) when it is determined that the scene is a document, programming at least one camera control for document capture; and
   d) capturing the scene with the programmed camera control
   wherein if, based on said evaluating step, said scene to be captured is a natural scene then a camera control unit optimizes camera settings for capturing said natural scene and an image processing unit applies image processing algorithms tailored for enhancing natural scenes to said natural scene.

2. The method of claim 1 further comprising:
   e) performing image processing tailored for documents on the captured scene.

3. The method of claim 1 wherein the preview is a lower resolution version of the scene to be captured.

4. The method of claim 1 wherein automatically determining whether the scene is a document includes
   dividing the preview into a plurality of regions;
   detecting the luminance edges in each region;
   counting the number of luminance edges in each region;
   determining the number of regions in which the number luminance edges is greater than a predetermined number of edges;
   when the number of regions exceeds a predetermined number of regions, classifying the preview as a document;
   otherwise, when the number of regions does not exceed the predetermined number of regions classifying the scene as a non-document.

5. The method of claim 1 wherein automatically determining whether the scene is a document includes
   classifying every pixel into three classes of pixels; wherein the classes include a text pixel class, a picture pixel class, and a background pixel class'
   counting the number of text pixels;
   determining whether the number of text pixels is in a predetermined relationship with a predetermined percentage of the total pixels;
   when the number of text pixels is in a predetermined relationship with a predetermined percentage of the total pixels, classifying the image as a document;
   otherwise, when the number of text pixels is not in a predetermined relationship with a predetermined percentage of the total pixels, classifying the image as a non-document.

6. The method of claim 1 wherein the digital camera includes an automatic flash, a shutter speed control, an aperture control, and a capture plane and a document to be captured is disposed in a document plane; wherein programming the camera controls for document capture includes
   instructing the user to position the digital camera in a first predetermined manner; wherein the capture plane is approximately parallel to the document plane;
   disabling the automatic flash; and
   setting the shutter speed to a predetermined shutter speed.

7. The method of claim 6 wherein setting the shutter speed to a predetermined shutter speed includes
   setting the shutter speed to be equal to or faster than 1/30 second.

8. The method of claim 6 wherein the digital camera further includes an ISO setting, the method comprising further the steps of:
   determining an aperture (f-number) based on the shutter speed setting;
   determining if the determined aperture setting is available;
   when the determined aperture setting is available, setting the aperture to the determined aperture setting;
   otherwise, when the determined aperture setting is not available, setting the aperture to the maximum available aperture and modifying an ISO setting.

9. The method of claim 1 wherein the digital camera includes a capture plane and a document to be captured is disposed in a document plane; wherein tailoring the camera controls for document capture includes
   instructing the user to position the digital camera in a second predetermined manner that reduces reflections from the document; wherein the capture plane is at a angle with respect to the document plane; wherein the angle is in a predetermined range of angle values;
   enabling the automatic flash; and
   setting a small aperture with an f-number that is greater than or equal to a predetermined value.

10. The method of claim 9 wherein the predetermined range of angle values includes the range from about 22 degrees to about 45 degrees; and
    wherein setting the f-number to a value that is greater than or equal to a predetermined minimum f-number includes
    setting the f-number to a value that is equal to or greater than f/5.6.

11. The method of claim 9 further comprising:
    determining a shutter speed based on the aperture setting; and
    setting a shutter speed setting to the determined shutter speed setting.

12. The method of claim 1 wherein performing image processing tailored for documents on the captured scene includes
    identifying edge pixels;
    sharpening the edge pixels;
    darkening the edge pixels; and
    performing luminance correction on the image.

13. The method of claim 1 wherein the document is one of a computer printout, information written on a whiteboard, a slide projected from a projector, a presentation displayed by an overhead projector.

14. The method of claim 1 wherein the document includes one of text, graphics, images, and a combination thereof.

15. An image capture system comprising:
    a) a preview unit for providing a preview of a scene to be captured;
    b) an automatic document detection unit coupled to the preview unit for receiving the preview of the scene and responsive thereto for automatically determining whether the scene is a document evaluating pixels of said preview of said scene to be captured to determine whether said scene to be captured is a document or whether said scene to be captured is a natural scene;
    c) a document camera control unit for setting at least one capture parameter tailored for capturing documents when it is determined that the scene is a document;

d) a image capture unit for capturing the scene with the set capture parameter wherein if said scene to be captured is a natural scene then a natural scene camera control unit optimizes camera settings for capturing said natural scene and an image processing unit applies image processing algorithms tailored for enhancing natural scenes to said natural scene.

16. The system of claim 15 further comprising:

e) a document image processing unit for performing image processing on the captured scene; wherein the image processing is tailored for documents.

17. The system of claim 15 wherein the automatic document detection unit divides the preview into a plurality of regions, detects the luminance edges in each region, counts the number of luminance edges in each region, determines the number of regions in which the number luminance edges is greater than a predetermined number of edges, when the number of regions is greater than a predetermined number of regions, classifying the preview as a document, otherwise, classifying the preview as a non-document.

18. The system of claim 15 wherein the automatic document detection unit classifies every pixel into three classes of pixels; wherein the classes include a text pixel class, a picture pixel class, and a background pixel class; counts the number of text pixels; determines whether the number of text pixels is in a predetermined relationship with a predetermined percentage of the total pixels; when the number of text pixels is in a predetermined relationship with a predetermined percentage of the total pixels, classifying the image as a document; and when the number of text pixels is not in a predetermined relationship with a predetermined percentage of the total pixels, classifying the image as a non-document.

19. The system of claim 15 wherein the document image processing unit identifies edge pixels, sharpens the edge pixels, darkens the edge pixels, and performs luminance correction on the image.

20. The system of claim 15 wherein the document is one of a computer printout, information written on a whiteboard, a slide projected from a projector, and a presentation displayed by an overhead projector; and wherein the document includes one of text, graphics, images, and a combination thereof.

21. A method for capturing images in a digital camera comprising the steps of:

a) receiving a digital preview of a scene to be captured;

b) image processing the scene to be captured by evaluating pixels associated with said scene to determine whether the scene is a document or a natural scene based on the preview;

c) programming at least one camera control for document capture if it is determined that the scene is a document;

d) programming at least one camera control for natural scene capture if it is determined that the scene is a natural scene; and e) capturing the scene with the programmed camera control.

* * * * *

UNITED STATES PATENT AND TRADEMARK OFFICE
CERTIFICATE OF CORRECTION

| | | |
|---|---|---|
| PATENT NO. | : 7,053,939 B2 | Page 1 of 1 |
| APPLICATION NO. | : 09/982620 | |
| DATED | : May 30, 2006 | |
| INVENTOR(S) | : Qian Lin et al. | |

It is certified that error appears in the above-identified patent and that said Letters Patent is hereby corrected as shown below:

In column 8, lines 6-7, in Claim 8, delete "method comprising further" and insert -- method further comprising --, therefor.

Signed and Sealed this

Nineteenth Day of January, 2010

David J. Kappos
*Director of the United States Patent and Trademark Office*